(No Model.)
H. H. RIGGIN.
VALVE.
No. 588,015. Patented Aug. 10, 1897.
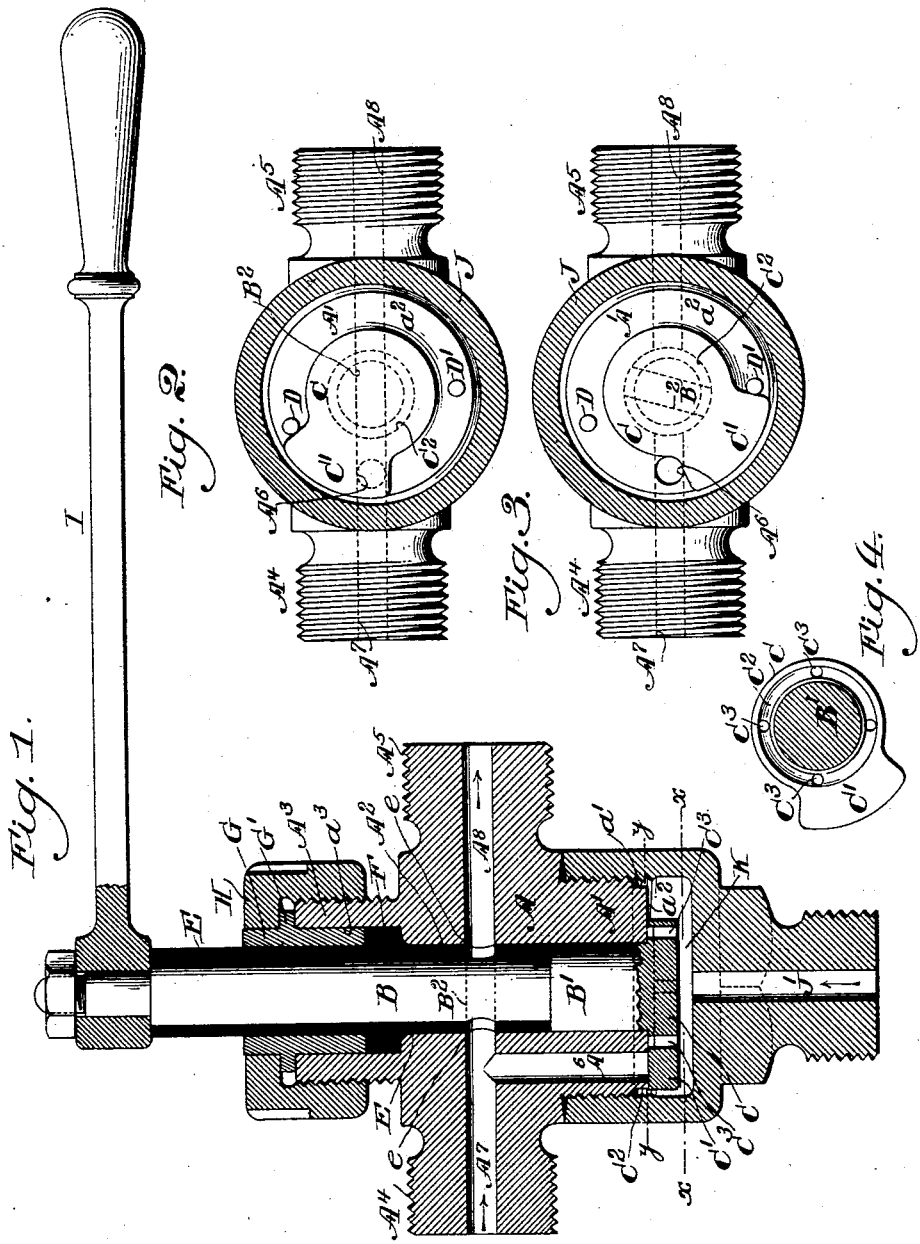
Witnesses.
Inventor.
Henry H. Riggin
by
Francis T. Chambers
his Attorney.

UNITED STATES PATENT OFFICE.

HENRY H. RIGGIN, OF ALTOONA, PENNSYLVANIA.

VALVE.

SPECIFICATION forming part of Letters Patent No. 588,015, dated August 10, 1897.

Application filed January 11, 1897. Serial No. 618,710. (No model.)

*To all whom it may concern:*

Be it known that I, HENRY H. RIGGIN, a citizen of the United States of America, residing at Altoona, in the county of Blair, in the State of Pennsylvania, have invented a certain new and useful Improvement in Valves, of which the following is a true and exact description, reference being had to the accompanying drawings, which form a part thereof.

My invention relates to valves, and particularly to valves intended for use with hydraulic machinery, my object being to provide a valve at once simple, cheap, and peculiarly efficient and durable.

The nature of my improvements will be best understood as described in connection with the drawings, in which they are illustrated, and in which—

Figure 1 is a longitudinal section through the center of my improved valve. Figs. 2 and 3 are cross-sections taken on the section-line $x$ $x$ of Fig. 1, showing the valve turned to different positions; and Fig. 4 is a cross-section through the spindle, taken on the line $y$ $y$ of Fig. 1, and showing the under side of the disk-valve which forms one feature of my invention.

A indicates the body portion of the valve, which, as shown and as conveniently made, is cruciform shape, the various "arms," so to speak, of the body being indicated at $A'$, $A^3$, $A^4$, and $A^5$. Through the center of the body portion A is formed a cylindrical bore $A^2$, which may be conveniently enlarged at the upper end, as indicated at $a^3$, for the reception of a stuffing-box gland.

$A^7$ and $A^8$ indicate, respectively, the delivery and exhaust ports of the valve, both formed transversely to the bore $A^2$ and opening into it, as indicated.

$A^6$ indicates the receiving-port of the valve, which opens at one end into the delivery-port $A^7$ and at the other end opens flush with the end $A^2$ of the arm $A'$ of the body portion. Each of the arms of the body portion are threaded, as shown, the threads on the arm $A'$ being adapted to engage with a chambered nut J, which screws upon it and is provided with a receiving-port $J'$. This chambered nut J forms, together with the face $a^2$, the chamber K of the valve. It will be noticed that the threads on the arm $A'$ do not run entirely to its end, the outer portion of the arm being recessed, as indicated at $a'$.

B is a spindle or valve-stem fitting in the cylindrical bore $A^2$. It is preferably formed of steel and may all be of a diameter, as indicated at its lower end $B'$, to fit closely in the bore $A^2$, but preferably it is formed, at least in its upper portion, of less diameter than the bore $A^2$ and provided with a removable bushing E, which does fit in the bore.

$B^2$ is a perforation formed through the stem B and through the bushing E, as indicated at $e$ $e$, said perforation being so placed as to register with and connect the ports $A^7$ $A^8$ when the spindle is turned into one of its possible positions.

F indicates gland-stuffing, G G' a gland, and H a nut screwing on the threaded end of the arm $A^3$ to hold the gland in position, and I indicates the valve or spindle actuating lever. At the lower end $B'$ of the stem B is secured a disk-valve C C', said valve being preferably formed integral with the spindle and its lateral extension C' being adapted to move over the face $a^2$ of the arm $A'$, so as to open and close the receiving-port $A^6$. In order to partially balance this valve, I preferably form it with an internal chamber $C^2$, and form through the valve passages, C by which the fluid in the chamber K has free communication with the chamber $C^2$.

D and D' (see Figs. 2 and 3) indicate stops which may be conveniently used with my valve. It will be understood that the arm $A^4$ and the port $A^7$ are connected with hydraulic machinery and the arm $A^5$ and the port $A^8$ with any convenient conduit for the exhaust fluid.

In operation the high-pressure fluid enters the chamber K through the passage $J'$, and when it is desired to pass it to the machine the spindle B is turned to the position indicated in Fig. 3, in which position the port $B^2$ does not connect the ports $A^7$ and $A^8$, and the valve extension C' is moved so as to open the port $A^6$ to the chamber K, permitting the high-pressure fluid to pass from the chamber K through ports $A^6$ and $A^7$ of the machine. By turning the spindle to the position indicated in Fig. 2 the valve extension C' closes the port $A^6$ and the passage $B^2$ registers with and connects the ports $A^7$ and $A^8$, permitting the fluid to exhaust from the machine through said ports.

It will be noticed that my valve is of exceedingly simple construction, involving few parts and the minimum of wear. The valve C C' can be ground to its seat or reground at any time, and the wear on the spindle B or its bushing E is but small, such wear as may take place being readily compensated for by a renewal of the bushing. At the same time all of the parts are well disposed to receive without injury the high pressures to which valves of this kind are subjected.

Having now described my invention, what I claim as new, and desire to secure by Letters Patent, is—

1. In a valve the combination of the body portion A having a cylindrical passage $A^2$ formed through it, delivery and exhaust ports as $A^7$ $A^8$ formed transversely to passage $A^2$ and opening into the same and a receiving-port as $A^6$ leading to the delivery-port and opening on the end of the body portion, with a spindle B situated in the passage $A^2$ and having a port $B^2$ formed through it in position to register with and connect the ports $A^7$ $A^8$ when said spindle is turned to one position, a disk-valve C C' secured to the end of the spindle adapted to bear on the end of the body portion and adapted to close and open the port $A^6$ as described.

2. In a valve the combination of the body portion A having a cylindrical passage $A^2$ formed through it, delivery and exhaust ports as $A^7$ $A^8$ formed transversely to passage $A^2$ and opening into the same and a receiving-port as $A^6$ leading to the delivery-port and opening on the end of the body portion, with a spindle B situated in the passage $A^2$ and having a port $B^2$ formed through it in position to register with and connect the ports $A^7$ $A^8$ when said spindle is turned to one position and having formed integral with it a disk-valve C C' adapted to bear on the end of the body portion and adapted to close and open the port $A^6$ as described.

3. In a valve the combination of the body portion A having a cylindrical passage $A^2$ formed through it, delivery and exhaust ports as $A^7$ $A^8$ formed transversely to passage $A^2$ and opening into the same and a receiving-port as $A^6$ leading to the delivery-port and opening on the end of the body portion, with a spindle B situated in the passage $A^2$ and having a port $B^2$ formed through it in position to register with and connect the ports $A^7$ $A^8$ when said spindle is turned to one position, a disk-valve C C' secured to the end of the spindle adapted to bear on the end of the body portion and adapted to close and open the port $A^6$ as described said valve having a chamber $C^2$ on its inner face and one or more passages $C^3$ leading thereto through the body of the valve.

4. In a valve the combination of the body portion A having a cylindrical passage $A^2$ formed through it, delivery and exhaust ports as $A^7$ $A^8$ formed transversely to passage $A^2$ and opening into the same and a receiving-port as $A^6$ leading to the delivery-port and opening on the end of the body portion, with a spindle B situated on the passage $A^2$, a removable bushing E surrounding said spindle said spindle and bushing having a port as $B^2$ $e$ $e$ formed through them in position to register with and connect ports $A^7$ $A^8$ in one position of said spindle and a disk-valve C C' formed integral with the spindle and adapted to close and open port $A^6$ as specified.

HENRY H. RIGGIN.

Witnesses:
L. S. WRIGHT,
C. C. DURBOROW.